(12) United States Patent
Hori et al.

(10) Patent No.: US 7,258,031 B2
(45) Date of Patent: Aug. 21, 2007

(54) TRANSMISSION

(75) Inventors: Yoshiaki Hori, Saitama (JP); Seiji Hamaoka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 99 days.

(21) Appl. No.: 11/110,758

(22) Filed: Apr. 21, 2005

(65) Prior Publication Data
US 2005/0183527 A1     Aug. 25, 2005

(51) Int. Cl.
*F16H 3/08* (2006.01)
*F16H 57/00* (2006.01)

(52) U.S. Cl. .............................. 74/329; 74/331; 74/404

(58) Field of Classification Search .......... 74/329–331, 74/333, 404; 123/197.1, 167.5
See application file for complete search history.

(56) References Cited

U.S. PATENT DOCUMENTS

| | | | |
|---|---|---|---|
| 3,149,498 | A | 9/1964 | Mack |
| 4,667,526 | A * | 5/1987 | Young .......................... 74/331 |
| 4,916,960 | A | 4/1990 | Inui et al. |
| 5,385,064 | A | 1/1995 | Reece |
| 6,332,371 | B1 | 12/2001 | Ohashi et al. |
| 6,487,924 | B2 | 12/2002 | Matsufuji et al. |
| 6,655,226 | B2 | 12/2003 | Oguri |
| 6,948,393 | B2 * | 9/2005 | Hori et al. ..................... 74/331 |

FOREIGN PATENT DOCUMENTS

JP          60-179328 A       9/1985

* cited by examiner

*Primary Examiner*—Roger Pang
(74) *Attorney, Agent, or Firm*—Birch, Stewart, Kolasch & Birch, LLP

(57) ABSTRACT

In the transmissions of the background art, two larger-diameter gears are mounted on a final shaft thereby causing an increase in weight of the transmission. The present invention reduces the weight of a transmission by mounting only one larger-diameter gear on a final shaft. The transmission of the present invention includes an output shaft; a countershaft extending parallel to the output shaft; an intermediate shaft extending parallel to the output shaft; a forward drive gear rotatably supported relative to the countershaft; a reverse drive gear rotatably supported relative to the countershaft; a first intermediate gear rotatably supported relative to the intermediate shaft, the first intermediate gear normally meshing with the reverse drive gear; a second intermediate gear rotatably supported relative to the intermediate shaft, the second intermediate gear being interlocked with the first intermediate gear to rotate therewith; an output shaft driven gear fixed to the output shaft, the output shaft driven gear being normally meshing with the forward drive gear and the second intermediate gear; and a gear selecting and fixing device axially movably mounted on the countershaft for selectively fixing the forward drive gear and the reverse drive gear to the countershaft.

18 Claims, 6 Drawing Sheets

TRANSMISSION

CROSS-REFERENCES TO RELATED APPLICATIONS

This non-provisional application claims priority under 35 U.S.C. § 119(a) on patent application No. 2002-197503 filed in Japan on Jul. 5, 2002, and priority under 35 U.S.C. § 120 on U.S. patent application Ser. No. 10/609,415 filed on Jul. 1, 2003 now U.S. Pat. No. 6,948,393, the entirety of each which are herein incorporated by reference.

BACKGROUND OF THE INVENTION

1. Field of the Invention

The present invention relates to a transmission, and more particularly to a transmission for a saddle type vehicle (buggy) for operation on rough terrain.

2. Description of the Background Art

A conventional transmission of the background art is described in Japanese Patent Publication No. 63-61212, the entirety of which is hereby incorporated by reference. This transmission includes a primary shaft, a main shaft, and a countershaft. Power is transmitted between the primary shaft, main shaft and countershaft respectively, e.g., the countershaft is a final shaft in this transmission.

In general, gears having diameters larger than the diameters of gears mounted on front-stage shafts are mounted on rear-stage shafts, e.g., so as to sequentially reduce a rotational speed during power transmission. In the above-described transmission of the background art, larger-diameter gears are mounted on the final shaft.

More specifically, two larger-diameter gears having different diameters are fixed to the final shaft (the countershaft in the above publication). Two smaller-diameter gears normally meshing with the two larger-diameter gears are rotatably supported relative to the shaft (the main shaft in the above publication) provided on the directly front stage of the final shaft. Further, gear selecting and fixing means (a gear selecting mechanism in the above publication) is provided between these smaller-diameter gears. Either of these smaller-diameter gears is selected and fixed to the support shaft by the gear selecting and fixing means, thereby allowing the selection of any one of different operational conditions.

Applicants have determined that the background art suffers from the following disadvantages. As mentioned above, the two larger-diameter gears are mounted on the final shaft of the transmission in the related art, causing an increase in weight of the transmission.

SUMMARY OF THE INVENTION

The present invention overcomes the shortcomings associated with the background art and achieves other advantages not realized by the background art.

An object of the present invention is to reduce the weight of the transmission by mounting only one larger-diameter gear on the final shaft;

One or more of these and other objects are accomplished by a transmission comprising an output shaft; a countershaft extending parallel to the output shaft; an intermediate shaft extending parallel to the output shaft; a forward drive gear being rotatably supported relative to the countershaft; a reverse drive gear being rotatably supported relative to the countershaft; a first intermediate gear being rotatably supported relative to the intermediate shaft, the first intermediate gear meshing with the reverse drive gear; a second intermediate gear rotatably supported relative to the intermediate shaft, the second intermediate gear being interlocked with the first intermediate gear to rotate therewith; an output shaft driven gear fixed to the output shaft, the output shaft driven gear meshing with the forward drive gear and the second intermediate gear; and a gear selecting and fixing device axially and movably mounted on the countershaft for selectively fixing the forward drive gear and the reverse drive gear to the countershaft.

One or more of these and other objects are further accomplished by a power unit for a four-wheeled vehicle comprising an internal combustion engine having a crankshaft arranged with respect to a longitudinal direction of the engine; a transmission including a main shaft operatively engaged with the crankshaft through a torque converter and a primary drive gear on the crankshaft and a primary driven gear on the main shaft; an output shaft; a countershaft extending parallel to the output shaft; an intermediate shaft extending parallel to the output shaft; a forward drive gear being rotatably supported relative to the countershaft; a reverse drive gear being rotatably supported relative to the countershaft; a first intermediate gear being rotatably supported relative to the intermediate shaft, the first intermediate gear meshing with the reverse drive gear; a second intermediate gear rotatably supported relative to the intermediate shaft, the second intermediate gear being interlocked with the first intermediate gear to rotate therewith; an output shaft driven gear fixed to the output shaft, the output shaft driven gear meshing with the forward drive gear and the second intermediate gear; and a gear selecting and fixing device axially and movably mounted on the countershaft for selectively engaging the forward drive gear and the reverse drive gear to the countershaft.

With this configuration, only one larger-diameter gear is mounted on the final shaft of the transmission as the output shaft driven gear, thereby allowing a reduction in the overall weight of the transmission.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE
PREFERRED EMBODIMENTS

Figure 1:
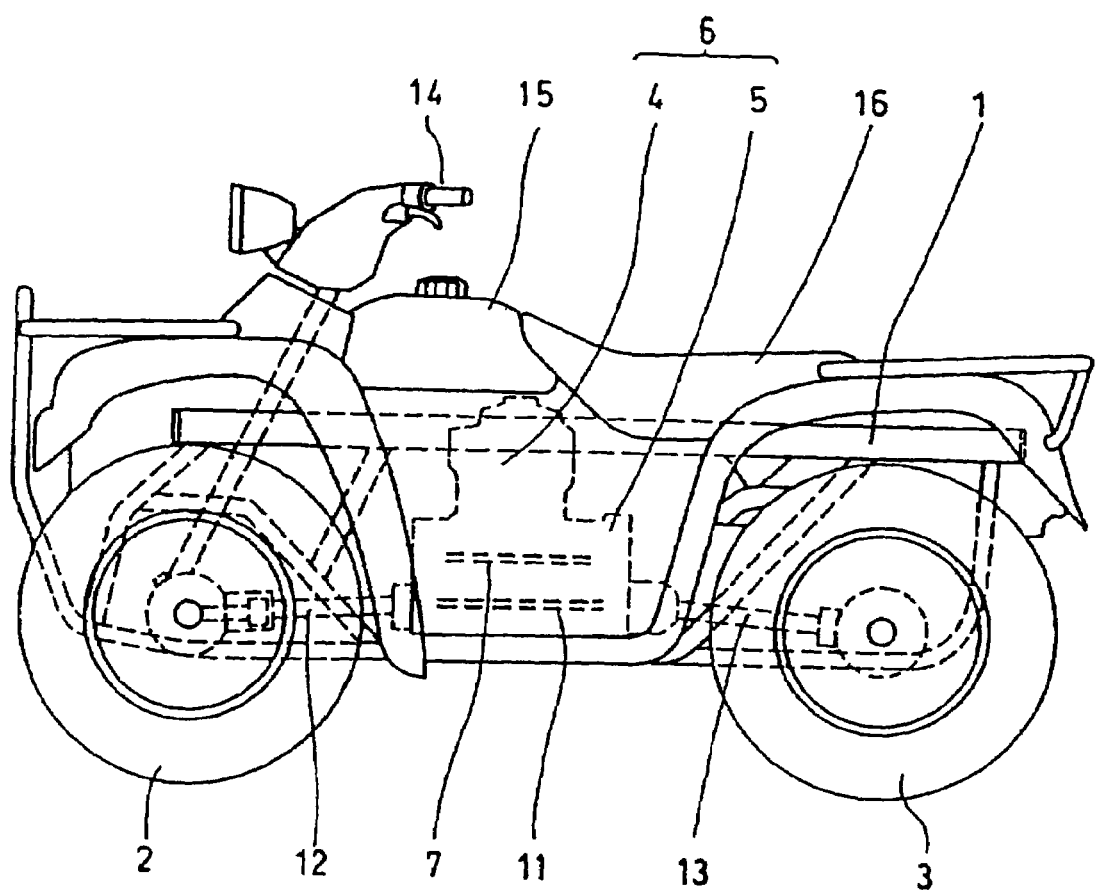
FIG. 1 is a side view of a four-wheeled buggy, e.g., saddle type vehicle for operating in rough terrain, having a transmission according to a preferred embodiment of the present invention.
Figure 2:
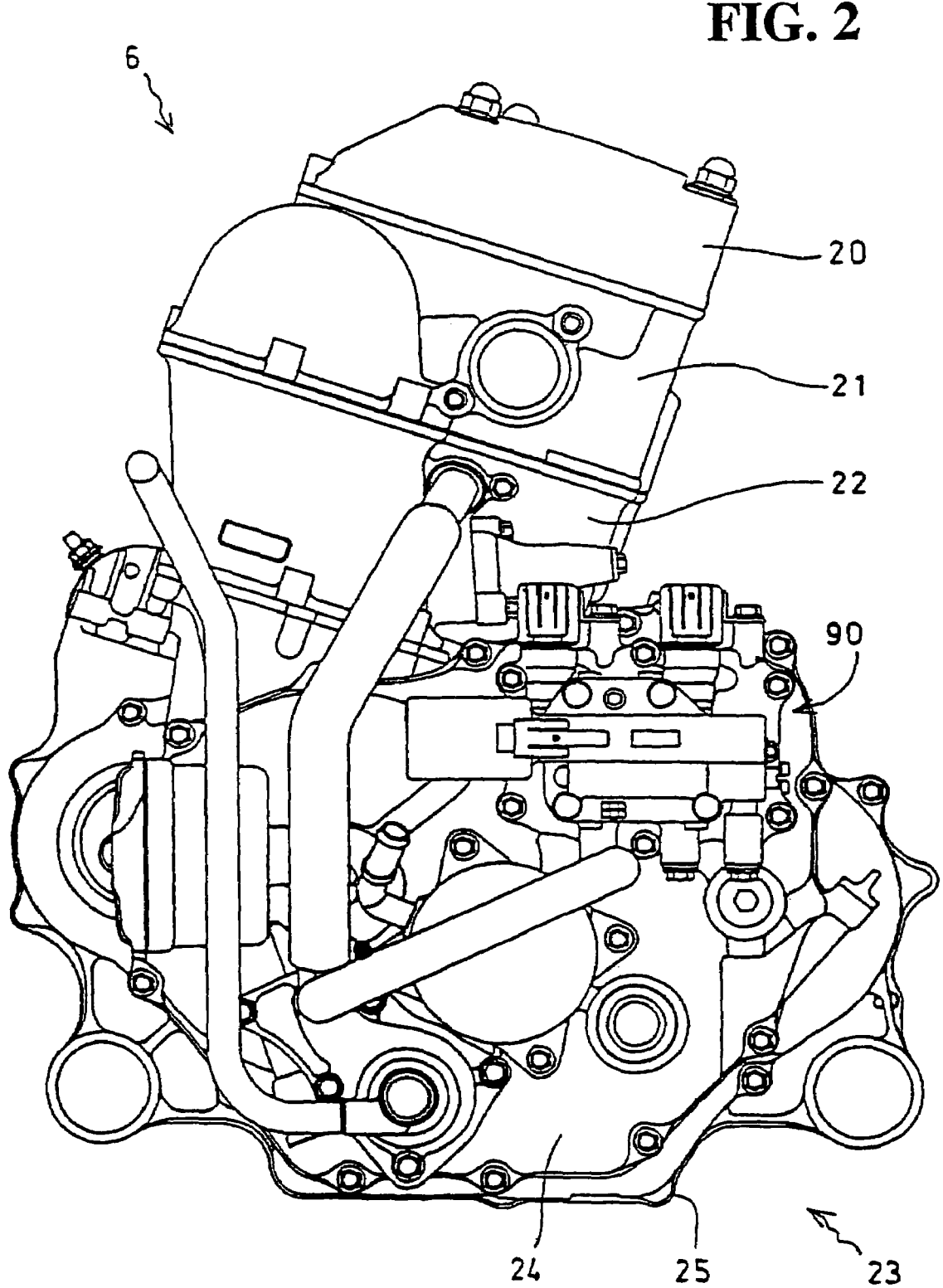
FIG. 2 is an elevational view of a power unit in the vehicle shown in FIG. 1.
Figure 3:
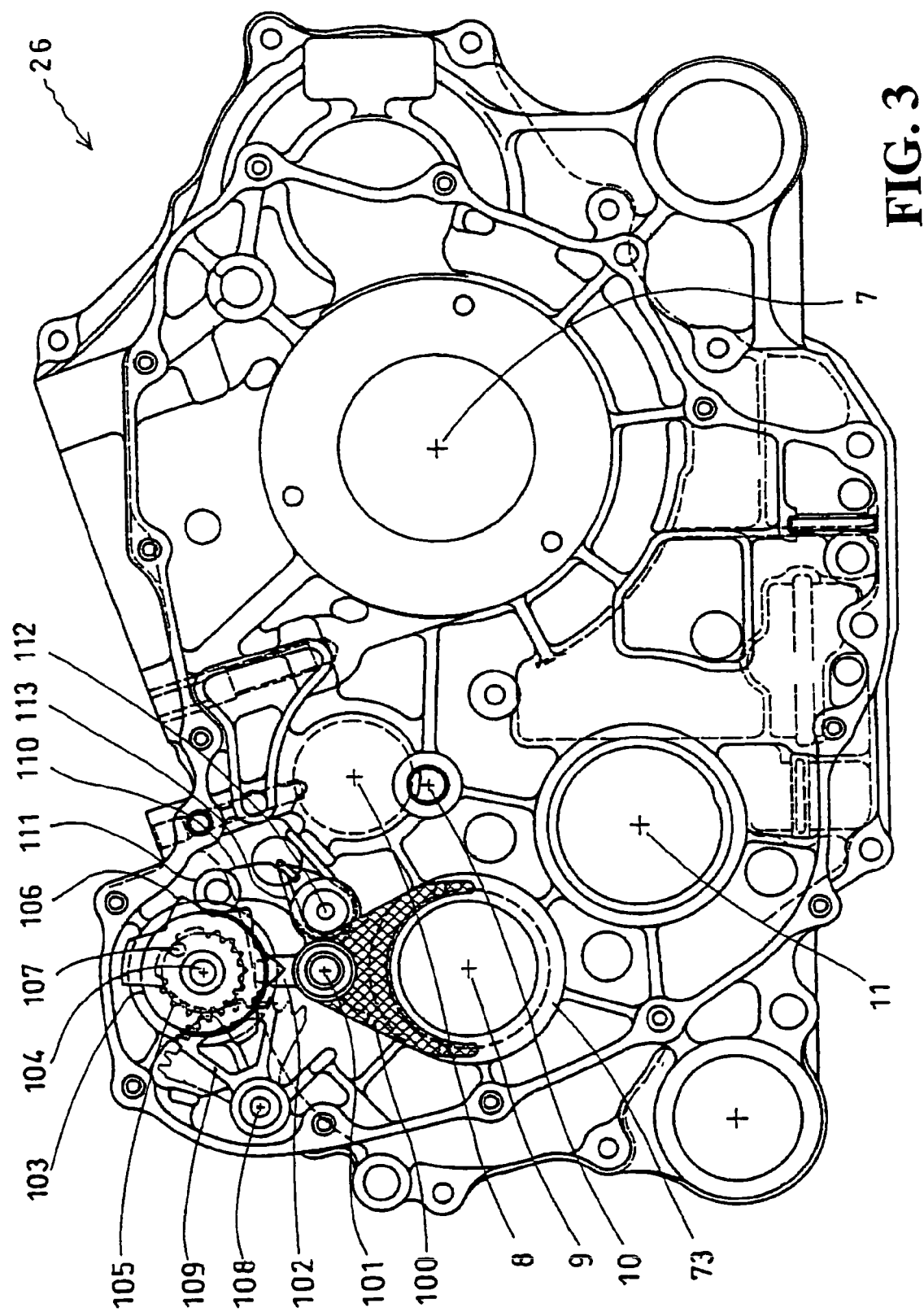
FIG. 3 is a rear elevation of a rear crankcase of the power unit.
Figure 4:
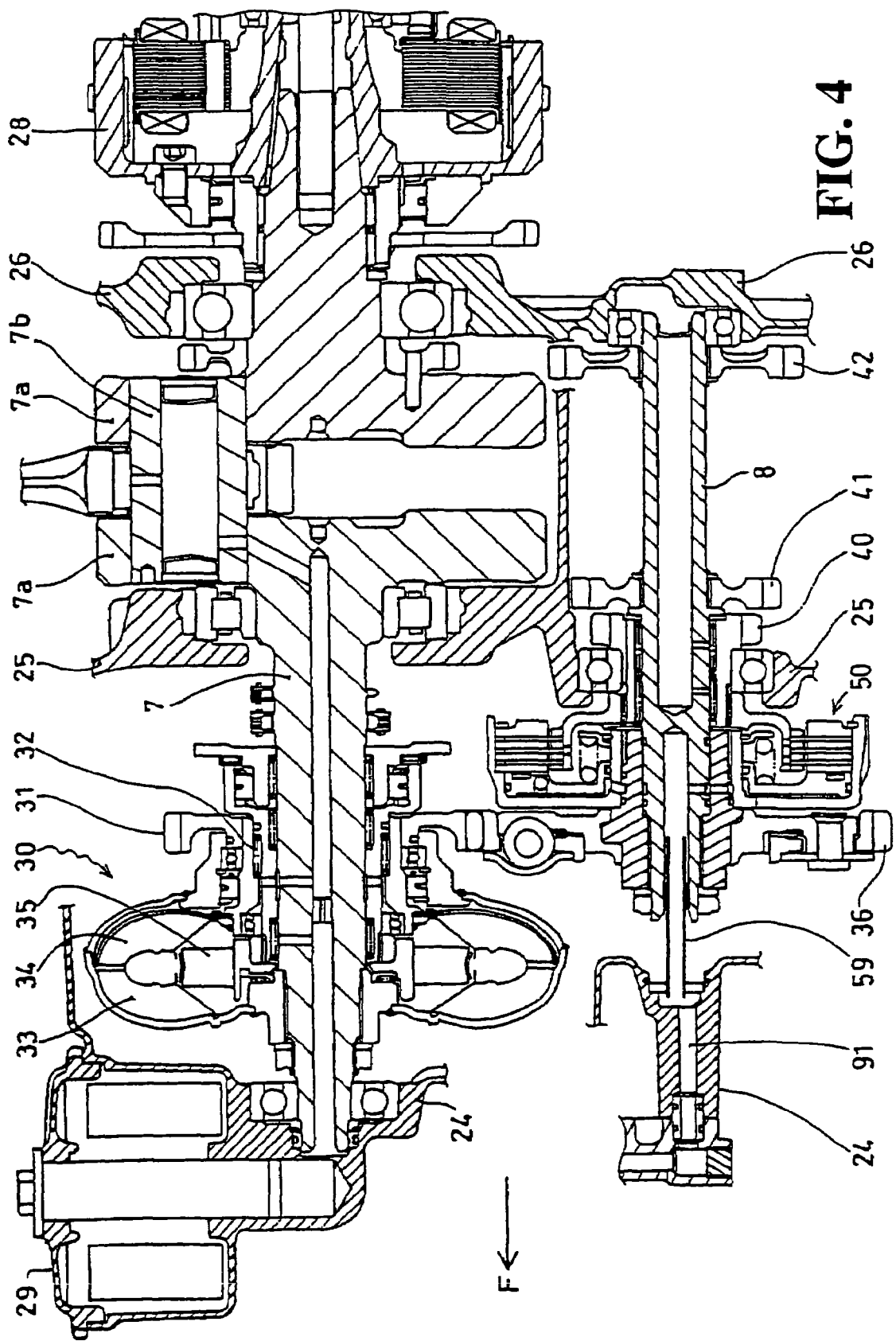
FIG. 4 is a longitudinal sectional view of an internal structure of a crankcase, showing a structural relationship between a crankshaft and a main shaft.
Figure 5:
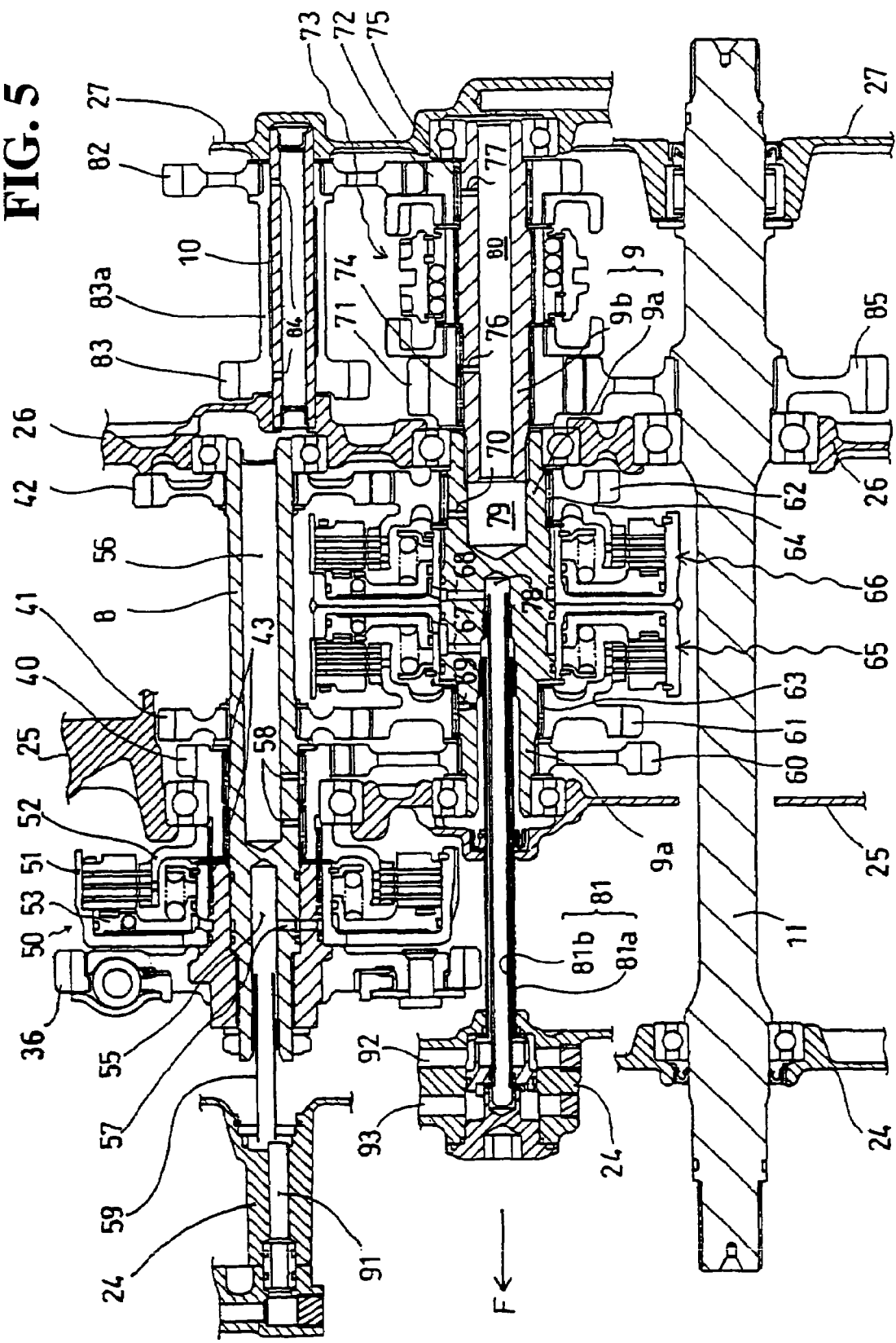
FIG. 5 is a longitudinal sectional view of the internal structure of the crankcase, showing the structural relationship between the main shaft, a countershaft, an intermediate shaft, and an output shaft.
Figure 6:
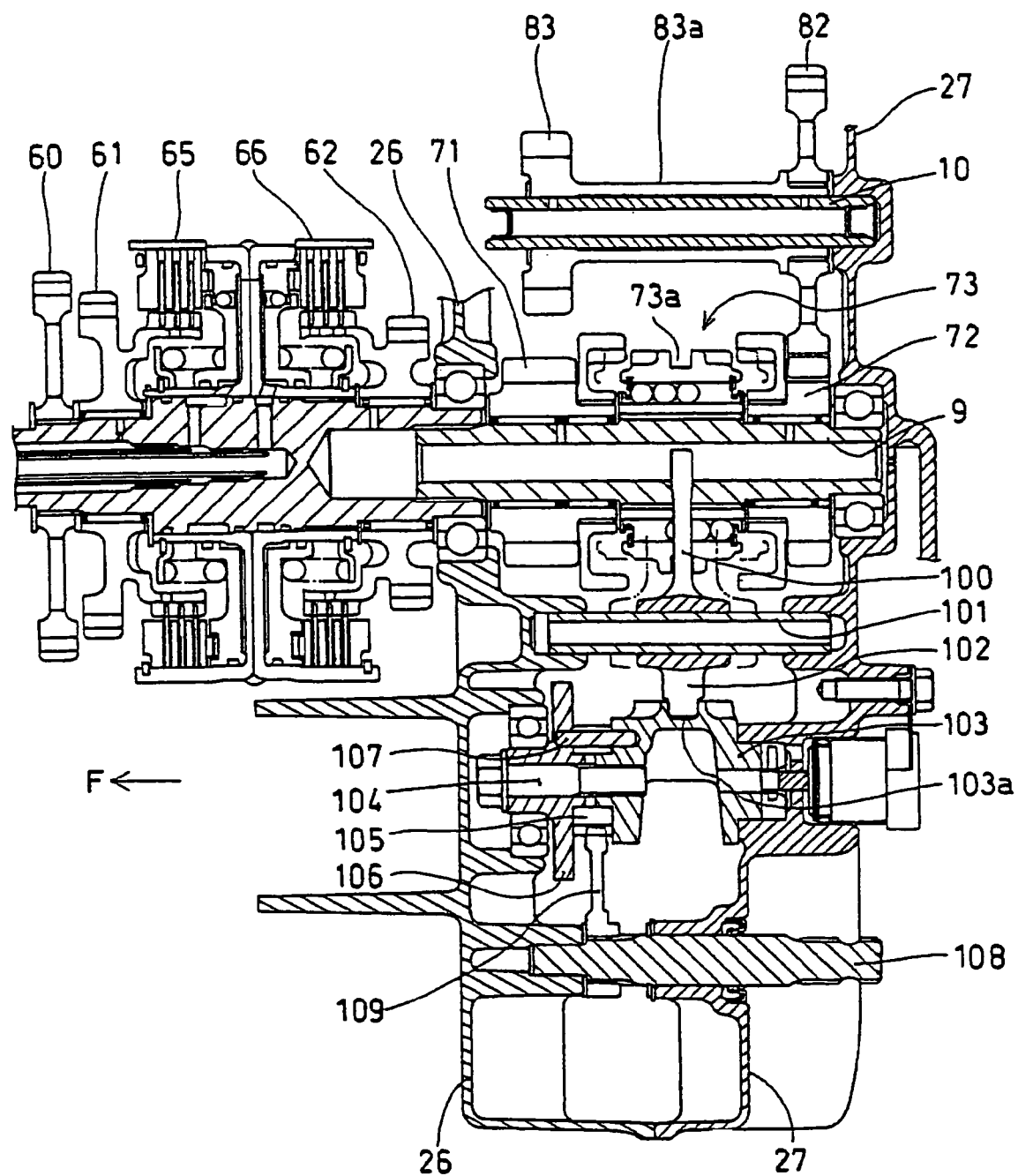
FIG. 6 is a longitudinal sectional view showing a driving mechanism for a dog clutch for forward/reverse selection.

The present invention will hereinafter be described with reference to the accompanying drawings. FIG. 1 is a side view of a four-wheeled buggy, e.g., saddle type vehicle for operating in rough terrain, having a transmission according to a preferred embodiment of the present invention. FIG. 2 is an elevational view of a power unit in the vehicle shown in FIG. 1. FIG. 3 is a rear elevation of a rear crankcase of the power unit. FIG. 4 is a longitudinal sectional view of an internal structure of a crankcase, showing a structural relationship between a crankshaft and a main shaft. FIG. 5 is a longitudinal sectional view of the internal structure of the crankcase, showing the structural relationship between the main shaft, a countershaft, an intermediate shaft, and an output shaft. FIG. 6 is a longitudinal sectional view showing a driving mechanism for a dog clutch for forward/reverse selection.

As seen in FIG. 1, a buggy includes a body frame 1, a pair of right and left front wheels 2 provided at a front portion of the body frame 1, and a pair of right and left rear wheels 3 provided at a rear portion of the body frame 1. A power unit 6 configured by integrating an internal combustion engine 4 and a transmission 5 is supported by a central portion of the body frame 1. The power unit 6 is arranged so that a crankshaft 7 extends in the longitudinal direction of the vehicle.

As will be described in greater detail hereinafter, the rotation of the crankshaft 7 is transmitted through a main shaft 8, a countershaft 9, and an intermediate shaft 10 (each being shown in FIG. 3) to an output shaft 11 in the transmission 5. These shafts 8, 9, 10, and 11 also extend parallel to the crankshaft 7 in the longitudinal direction of the vehicle. The front wheels 2 are driven by a front drive shaft 12 connected to the front end of the output shaft 11, and the rear wheels 3 are driven by a rear drive shaft 13 connected to the rear end of the output shaft 11. A steering handle 14, a fuel tank 15, and a saddle seat 16 are arranged in this order from the front side of the vehicle on an upper portion of the body frame 1.

FIG. 2 is an elevational view of the power unit 6 as viewed from the front side of the power unit 6. The power unit 6 generally includes a cylinder head cover 20, a cylinder head 21, a cylinder block 22, and a crankcase 23 arranged in this order from the upper side of the power unit 6. The crankcase 23 is divided into four parts along planes perpendicular to the crankshaft 7. That is, as partially shown in FIGS. 4 and 5, the crankcase 23 includes a front crankcase cover 24, a front crankcase 25, a rear crankcase 26, and a rear crankcase cover 27 arranged in this order from the front side of the power unit 6. In FIG. 2, the front crankcase cover 24 is generally shown and the front crankcase 25 is slightly shown around the front crankcase cover 24. Various devices and pipes are mounted on the front surface of the front crankcase cover 24.

FIG. 3 is a rear elevation of the rear crankcase 26, showing the positions of the crankshaft 7, the main shaft 8, the countershaft 9, the intermediate shaft 10, and the output shaft 11. FIGS. 4 and 5 are longitudinal sectional views showing an internal structure of the crankcase 23 along these shafts 7 to 11. More specifically, FIG. 4 shows the relationship between the crankshaft 7 and the main shaft 8, and FIG. 5 shows the relationship between the main shaft 8, the countershaft 9, the intermediate shaft 10, and the output shaft 11. In FIGS. 4 and 5, the arrow F indicates the front side of the crankcase 23.

FIG. 4 shows a power transmitting mechanism for the crankshaft 7 and the main shaft 8. The crankshaft 7 is rotatably supported through bearings to the front and rear crankcases 25 and 26. An extended front end of the crankshaft 7 is supported through a bearing to the front crankcase cover 24. The crankshaft 7 is divided into front and rear sections in the longitudinal direction. The front and rear sections of the crankshaft 7 are connected at their crank webs 7a by a crankpin 7b. An alternator 28 for producing alternating current by the rotation of the crankshaft 7 is mounted on a rear end portion of the crankshaft 7 (the rear section). Reference numeral 29 denotes an oil filter provided on the front crankcase cover 24 for cleaning a clutch operating oil.

A torque converter 30 is mounted on a front portion of the crankshaft 7 (the front section), and a primary drive gear 31 is mounted adjacent to the torque converter 30. The primary drive gear 31 is rotatably supported through a needle bearing 32 relative to the crankshaft 7. The torque converter 30 includes a pump impeller 33 fixed to the crankshaft 7, a turbine runner 34 opposed to the pump impeller 33, and a stator 35. The primary drive gear 31 rotatable relative to the crankshaft 7 is connected to the turbine runner 34, and power from the crankshaft 7 is hydraulically transmitted through the torque converter 30 to the primary drive gear 31. A primary driven gear 36 normally meshing with the primary drive gear 31 is fixed to a front end portion of the main shaft 8. The rotation of the crankshaft 7 is transmitted through the torque converter, the primary drive gear 31, and the primary driven gear 36 to the main shaft 8 with a primary speed reduction obtained by the gears 31 and 36.

FIG. 5 shows a power transmitting mechanism and its relationship with the main shaft 8, the countershaft 9, the intermediate shaft 10, and the output shaft 11. The main shaft 8 is rotatably supported through bearings to the front and rear crankcases 25 and 26. A first-speed drive gear 40, a second-speed drive gear 41, and a third-speed drive gear 42 different in the number of teeth according to gear ratios are mounted on the main shaft 8. The second-speed drive gear 41 and the third-speed drive gear 42 are fixed to the main shaft 8, and the first-speed drive gear 40 is relatively rotatably supported through needle bearings 43 to the main shaft 8. In the following description, a gear relatively rotatably supported through a needle bearing to a rotating shaft will be referred to generally as an idle gear. A first-speed hydraulic multi-plate clutch 50 is interposed between the main shaft 8 and the first-speed drive gear 40. The first-speed hydraulic multi-plate clutch 50 has an outer member 51 fixed to the main shaft 8 and an inner member 52 connected to the first-speed drive gear 40. A pressure plate 53 is axially movably engaged in the outer member 51. The main shaft 8 has a front center hole 55 axially extending from the front end of the main shaft 8 to an intermediate portion and a rear center hole 56 axially extending from the rear end of the main shaft 8 to the intermediate portion. The rear center hole 56 is slightly larger in diameter than the front center hole 55. Thus, the front center hole 55 and the rear center hole 56 of the main shaft 8 are not in communication with each other at this intermediate portion. The main shaft 8 further has an operating oil supply hole 57 communicating with the front center hole 55 and the first-speed hydraulic multi-plate clutch 50, and has lubricating oil supply holes 58 communicating with the rear center hole 56 and the needle bearings 43.

As shown in FIG. 5, an operating oil for the first-speed hydraulic multi-plate clutch 50 is supplied from the front crankcase cover 24 side through an operating oil supply pipe 59 into the front center hole 55, and is further supplied through the operating oil supply hole 57 into the clutch 50. The operating oil supplied to the clutch 50 is introduced into a space between the outer member 51 and the pressure plate 53. When the pressure plate 53 is moved by this oil pressure to engage the clutch 50, the first-speed drive gear 40 is fixed to the main shaft 8, so that the rotation of the main shaft 8 is transmitted to the first-speed drive gear 40. A lubricating oil to the needle bearings 43 for supporting the first-speed drive gear 40 is supplied from the rear center hole 56 through the lubricating oil supply holes 58.

The countershaft 9 is composed of a front countershaft 9a and a rear countershaft 9b integrally connected with each other. The countershaft 9 is rotatably supported through bearings to the front crankcase 25, the rear crankcase 26, and the rear crankcase cover 27. A first-speed driven gear 60, a second-speed driven gear 61, and a third-speed driven gear 62 respectively meshing with the first-speed drive gear 40, the second-speed drive gear 41, and the third-speed drive gear 42 supported to the main shaft 8 are mounted on the front countershaft 9a. The first-speed driven gear 60 is fixed to the front countershaft 9a. The second-speed driven gear 61 and the third-speed driven gear 62 are idle gears, which are rotatably supported through needle bearings 63 and 64 relative to the front countershaft 9a, respectively.

A second-speed hydraulic multi-plate clutch 65 is interposed between the front countershaft 9a and the second-speed driven gear 61. A third-speed hydraulic multi-plate clutch 66 is interposed between the front countershaft 9a and the third-speed driven gear 62. The second-speed hydraulic multi-plate clutch 65 has an outer member fixed to the front countershaft 9a and an inner member connected to the idle gear 61, and the third-speed hydraulic multi-plate clutch 66 has an outer member fixed to the front countershaft 9a and an inner member connected to the idle gear 62. These clutches 65 and 66 are similar in configuration and operation to the first-speed hydraulic multi-plate clutch 50 mentioned above. An operating oil for these clutches 65 and 66 is supplied through operating oil supply holes 67 and 68 formed in the front countershaft 9a, respectively, thereby stopping idle rotation of the idle gears 61 and 62 to permit power transmission and effect a second-speed or third-speed reduction. A lubricating oil to the needle bearings 63 and 64 for respectively supporting the second-speed driven gear 61 and the third-speed driven gear 62 is supplied through lubricating oil supply holes 69 and 70 formed in the front countershaft 9a.

The front countershaft 9a has a front center hole 78 axially extending from the front end of the shaft 9a to an intermediate portion and a rear center hole 79 axially extending from the rear end of the shaft 9a to the intermediate portion. The front center hole 78 has a stepwise diameter, and the rear center hole 79 is larger in diameter than the front center hole 78. Thus, the front center hole 78 and the rear center hole 79 of the front countershaft 9a are not in communication with each other at this intermediate portion. On the other hand, the rear countershaft 9b has a through center hole 80 axially extending between the opposite ends of the shaft 9b. The front end of the rear countershaft 9b is engaged with the rear center hole 79 of the front countershaft 9a, thus making an integral rotation of the front and rear countershafts 9a and 9b. The rear center hole 79 of the front countershaft 9a is in communication with the through center hole 80 of the rear countershaft 9b.

The supply of the operating oil to the second-speed and third-speed hydraulic multi-plate clutches 65 and 66 is performed through a double pipe 81 inserted in the front center hole 78 of the countershaft 9 from the front crankcase cover 24 side. The double pipe 81 is composed of an outer pipe 81a and an inner pipe 81b inserted in the outer pipe 81a. The operating oil to the second-speed hydraulic multi-plate clutch 65 is supplied through an oil passage defined between the outer pipe 81a and the inner pipe 81b and through the operating oil supply hole 67. The operating oil to the third-speed hydraulic multi-plate clutch 66 is supplied through an oil passage defined inside the inner pipe 81b and through the operating oil supply hole 68. The lubricating oil to the needle bearing 63 for supporting the second-speed driven gear 61 is supplied from the front crankcase 25 side through an oil passage defined between the front countershaft 9a and the outer pipe 81a and through the lubricating oil supply hole 69. The lubricating oil to the needle bearing 64 for supporting the third-speed driven gear 62 is supplied from the rear crankcase cover 27 side through the through center hole 80, the rear center hole 79, and the lubricating oil supply hole 70.

A forward drive gear 71 and a reverse drive gear 72 are mounted on the rear countershaft 9b. These gears 71 and 72 are idle gears. A manually operated dog clutch 73, providing a gear selecting and fixing function, is interposed between these gears 71 and 72 so that the dog clutch 73 is engageable with either the gear 71 or 72. Accordingly, either the gear 71 or 72 engaged with the dog clutch 73 is selectively fixed to the rear countershaft 9b, thereby allowing power transmission. The rear countershaft 9b is formed with lubricating oil supply holes 76 and 77 for respectively supplying the lubricating oil to needle bearings 74 and 75 for respectively supporting the forward drive gear 71 and the reverse drive gear 72. The lubricating oil to the needle bearings 74 and 75 is supplied from the rear crankcase cover 27 side through the through center hole 80 and the lubricating oil supply holes 76 and 77 of the rear countershaft 9b.

The intermediate shaft 10 is supported by the rear crankcase 26 and the rear crankcase cover 27. A first intermediate gear 82 normally meshing with the reverse drive gear 72 and a second intermediate gear 83 having a long sleeve portion 83a connected to the first intermediate gear 82 is rotatably supported relative to the intermediate shaft 10. These gears 82 and 83 are idle gears. The lubricating oil to sliding portions of the intermediate shaft 10 for sliding the first and second intermediate gears 82 and 83 is supplied from the rear crankcase 26 side through a center hole of the intermediate shaft 10 and lubricating oil supply holes 84 of the intermediate shaft 10.

The output shaft 11 is rotatably supported through bearings to the front crankcase cover 24, the rear crankcase 26, and the rear crankcase cover 27. The output shaft 11 extends through the front crankcase 25 in a non-contact relationship therewith. An output shaft driven gear 85 normally meshing with the forward drive gear 71 and the second intermediate gear 83 is fixed to the output shaft 11. The output shaft driven gear 85 is driven in a forward direction or a reverse direction through either the gear 71 or 72 engaged with the dog clutch 73, thereby rotating the output shaft 11 in a direction adapted to the forward running or reverse running of the vehicle. The reverse driving of the output shaft driven gear 85 is effected only when the countershaft 9 is being rotated at the first speed.

All of the gears in this transmission are constant-mesh type gears, and what gear ratio is to be selected is determined by the hydraulic multi-plate clutches 50, 65, and 66 that is engaged. The hydraulic control for these clutches 50, 65, and 66 is performed by a valve body 90 (see FIG. 2) assembled as a hydraulic control unit including a solenoid valve and a pressure switching valve. As shown in FIG. 2, the valve body 90 is mounted on the front surface of the front crankcase cover 24.

As shown in FIG. 5, the operating oil to the first-speed hydraulic multi-plate clutch 50 is supplied from the valve body 90 through an oil passage 91 formed in the front crankcase cover 24 and the operating oil supply pipe 59 inserted in the front center hole 55 of the main shaft 8 into the front center hole 55, and is further supplied through the operating oil supply hole 57 to the first-speed hydraulic multi-plate clutch 50.

The operating oil to the second-speed hydraulic multi-plate clutch 65 or the third-speed hydraulic multi-plate clutch 66 is supplied from the valve body 90 through an oil passage 92 or 93 formed in the front crankcase cover 24 and the outer passage or the inner passage of the double pipe 81 inserted in the front center hole 78 of the countershaft 9 into the front center hole 78. The operating oil is further supplied through the operating oil supply hole 67 or 68 to the second-speed hydraulic multi-plate clutch 65 or the third-speed hydraulic multi-plate clutch 66.

A driving mechanism for the dog clutch 73 for selecting the forward running or the reverse running of the vehicle is shown in FIGS. 3 and 6. Referring to FIG. 6, the outer surface of the dog clutch 73 is formed with a circumferential groove 73a, and a shift fork 100 is engaged at its forked portion with the circumferential groove 73a of the dog clutch 73. The shift fork 100 is axially slidably engaged with a guide shaft 101. The guide shaft 101 is a fixed shaft supported to the rear crankcase 26 and the rear crankcase cover 27. The shift fork 100 is integrally formed with a shifter pin 102 opposite to the forked portion. The head of the shifter pin 102 is slidably engaged with a helical groove 103a formed on a shift drum 103.

The helical groove 103a of the shift drum 103 is a short groove extending along a substantially half portion of the outer circumference of the shift drum 103. Accordingly, an unnecessary portion of the shift drum 103 is cut away for the purpose of weight reduction. The shift drum 103 is supported to a drum shaft 104. A drum driven gear 105 and a shift cam 106 are also mounted on the drum shaft 104. The shift drum 103, the drum driven gear 105, and the shift cam 106 are joined together by an interlocking pin 107 to restrain their relative rotation, e.g., so that these members 103, 105, and 106 are rotated together.

A shift spindle 108 is rotatably supported to the rear crankcase 26 and the rear crankcase cover 27. A sector gear 109 meshing with the drum driven gear 105 is fixed to the shift spindle 108. When the shift spindle 108 is rotated, the drum driven gear 105, the shift drum 103, and the shift cam 106 are rotated together by the sector gear 109. The shift spindle 108 is connected through an operating cable (not shown) to a shift lever (not shown) provided on the steering handle 14 of the vehicle, and is rotated by manually operating the shift lever.

As shown in FIG. 3, the shift cam 106 is a star plate member, and a roller 111 supported at the upper end of a shift drum stopper 110 is in contact with the outer circumference of the shift cam 106. The shift drum stopper 110 is pivotably supported to a pin 112, and a spring 113 is engaged with the shift drum stopper 110 to normally bias the roller 111 against the outer circumference of the shift cam 106. This mechanism constitutes a rotational position holding device for the shift drum 103 such that the rotational position of the shift drum 103 becomes stable when the roller 111 comes into contact with any one of the valleys formed on the outer circumference of the shift cam 106. There are three stable positions of the shift drum 103 corresponding to forward, neutral, and reverse conditions.

When the shift lever provided on the steering handle 14 of the vehicle is rotationally operated from a neutral position to a forward position or a reverse position, the shift spindle 108 and the sector gear 109 are rotated together, thereby rotating the drum driven gear 105 to a stable position given by the shift cam 106. At the same time, the shift drum 103 is rotated about the drum shaft 104 together with the drum driven gear 105 by the operation of the interlocking pin 107, so that the shifter pin 102 is pushed by the inner edge of the helical groove 103a formed on the outer circumference of the shift drum 103. As a result, the shift fork 100 supported to the guide shaft 101 is axially slid, and the dog clutch 73 is accordingly moved in the axial direction of the countershaft 9 through the circumferential groove 73a of the dog clutch 73. At this time, one of the projections formed at the opposite ends of the dog clutch 73 comes into engagement with either the forward drive gear 71 or the reverse drive gear 72 to fix the gear 71 or 72 to the countershaft 9, thus allowing power transmission and effecting forward or reverse running of the vehicle.

According to this preferred embodiment as described above in detail, the countershaft and the intermediate shaft are provided parallel to the output shaft. The forward drive gear and the reverse drive gear are rotatably supported relative to the countershaft. The first intermediate gear and the second intermediate gear are rotatably supported relative to the intermediate shaft. The first intermediate gear is normally in mesh with the reverse drive gear, and the second intermediate gear is rotatable together with the first intermediate gear. The single output shaft driven gear normally meshing with the forward drive gear and the second intermediate gear is fixed to the output shaft as a final shaft. Further, the dog clutch, performing the gear selecting and fixing function, is provided to selectively fix the forward drive gear and the reverse drive gear to the countershaft, thereby selecting different operational conditions of the vehicle. Thus, only one larger-diameter gear is mounted on the final shaft of the transmission as the output shaft driven gear, thereby allowing a reduction in weight of the transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission comprising:
   a main shaft;
   an output shaft;
   a countershaft extending parallel to said output shaft and the counter shaft being in a position that is below the main shaft and above the output shaft in a vertical direction of the transmission;

an intermediate shaft extending parallel to said output shaft;

a forward drive gear being rotatably supported relative to said countershaft;

a reverse drive gear being rotatably supported relative to said countershaft;

a first intermediate gear being rotatably supported relative to said intermediate shaft, said first intermediate gear meshing with said reverse drive gear;

a second intermediate gear rotatably supported relative to said intermediate shaft, said second intermediate gear being interlocked with said first intermediate gear to rotate therewith;

an output shaft driven gear fixed to said output shaft, said output shaft driven gear meshing with said forward drive gear and said second intermediate gear, wherein said output shaft driven gear is the only gear attached to said output shaft; and a gear selecting and fixing device axially and movably mounted on said countershaft for selectively engaging said forward drive gear and said reverse drive gear to said countershaft.

2. The transmission according to claim 1, wherein said forward and reverse drive gears, said first and second intermediate gears, and said output shaft driven gear are constant-mesh gears.

3. The transmission according to claim 1, further comprising at least one hydraulic multi-plate clutch.

4. The transmission according to claim 1, further comprising a main shaft operatively engaged with a crankshaft through a primary driven gear and a torque converter.

5. The transmission according to claim 4, further comprising:
a first speed hydraulic multi-plate clutch;
a second speed hydraulic multi-plate clutch; and
a third speed hydraulic multi-plate clutch.

6. The transmission according to claim 5, wherein said forward and reverse drive gears, said first and second intermediate gears, and said output shaft driven gear are constant-mesh gears.

7. The transmission according to claim 1, wherein the gear selecting and fixing device selectively fixes said forward drive gear and said reverse drive gear directly to the countershaft.

8. The transmission according to claim 7, further comprising at least one hydraulic multi-plate clutch.

9. The transmission according to claim 1, wherein a forward end of the output shaft extends further in a forward direction than forward ends of the counter shaft and the intermediate shaft.

10. A power unit for a four-wheeled vehicle comprising:
an internal combustion engine having a crankshaft arranged with respect to a longitudinal direction of said engine;

a transmission including a main shaft operatively engaged with said crankshaft through a torque converter and a primary drive gear on said crankshaft and a primary driven gear on said main shaft;

an output shaft;

a countershaft extending parallel to said output shaft;

an intermediate shaft extending parallel to said output shaft;

a forward drive gear being rotatably supported relative to said countershaft;

a reverse drive gear being rotatably supported relative to said countershaft;

a first intermediate gear being rotatably supported relative to said intermediate shaft, said first intermediate gear meshing with said reverse drive gear;

a second intermediate gear rotatably supported relative to said intermediate shaft, said second intermediate gear being interlocked with said first intermediate gear to rotate therewith; an output shaft driven gear fixed to said output shaft, said output shaft driven gear meshing with said forward drive gear and said second intermediate gear, wherein said output shaft driven gear is the only gear attached to said output shaft; and a gear selecting and fixing device axially and movably mounted on said countershaft for selectively engaging said forward drive gear and said reverse drive gear to said countershaft, wherein a forward end of the output shaft extends further in a forward direction than forward ends of the counter shaft and the intermediate shaft, wherein a rear end of the output shaft extends further in a rearward direction than rear ends of the counter shaft and the intermediate shaft.

11. The power unit according to claim 10, wherein said gear selecting and fixing device is a manually operated dog clutch.

12. The power unit according to claim 10, wherein said forward and reverse drive gears, said first and second intermediate gears, and said output shaft driven gear are constant-mesh gears.

13. The power unit according to claim 10, further comprising:
a first speed hydraulic multi-plate clutch;
a second speed hydraulic multi-plate clutch; and
a third speed hydraulic multi-plate clutch.

14. The power unit according to claim 10, wherein the gear selecting and fixing device selectively fixes said forward drive gear and said reverse drive gear directly to the countershaft.

15. The power unit according to claim 10, wherein the counter shaft is in a position that is below a main shaft and above the output shaft in a vertical direction of the transmission.

16. A transmission comprising:
a main shaft;
an output shaft;
a countershaft extending parallel to said output shaft and the main shaft, the counter shaft being in a position that is below the main shaft and above the output shaft in a vertical direction of the transmission;

an intermediate shaft extending parallel to said output shaft;

a forward drive gear being rotatably supported relative to said countershaft;

a reverse drive gear being rotatably supported relative to said countershaft;

a first intermediate gear being rotatably supported relative to said intermediate shaft, said first intermediate gear meshing with said reverse drive gear;

a second intermediate gear rotatably supported relative to said intermediate shaft, said second intermediate gear being interlocked with said first intermediate gear to rotate therewith;

an output shaft driven gear fixed to said output shaft, said output shaft driven gear meshing with said forward drive gear and said second intermediate gear; and a gear selecting and fixing device axially and movably mounted on said countershaft for selectively engaging said forward drive gear and said reverse drive gear to said countershaft, wherein said gear selecting and fixing device is a manually operated dog clutch.

17. The transmission according to claim 16, wherein the gear selecting and fixing device selectively fixes said forward drive gear and said reverse drive gear directly to the countershaft.

18. The transmission according to claim 16, wherein a forward end of the output shaft extends further in a forward direction than forward ends of the counter shaft and the intermediate shaft.

* * * * *